H. K. HALLER.
TRANSPORT SYSTEM FOR POSTAGE AND OTHER GOODS.
APPLICATION FILED JUNE 25, 1918.
1,327,952.
Patented Jan. 13, 1920.
3 SHEETS—SHEET 2.
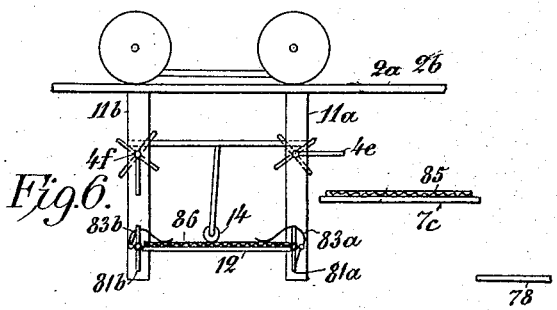
Fig.6.
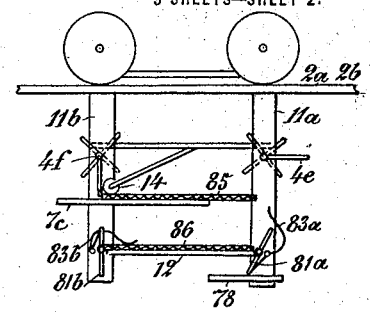
Fig.7.
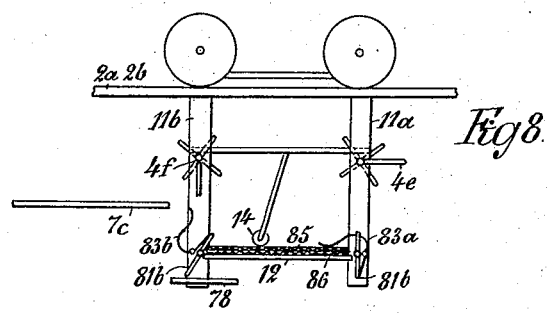
Fig.8.
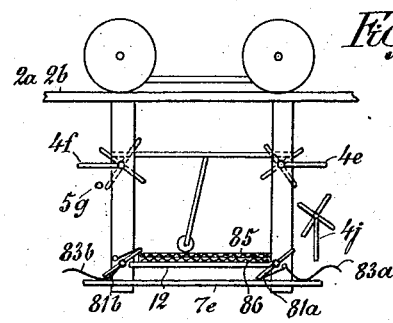
Fig.9.
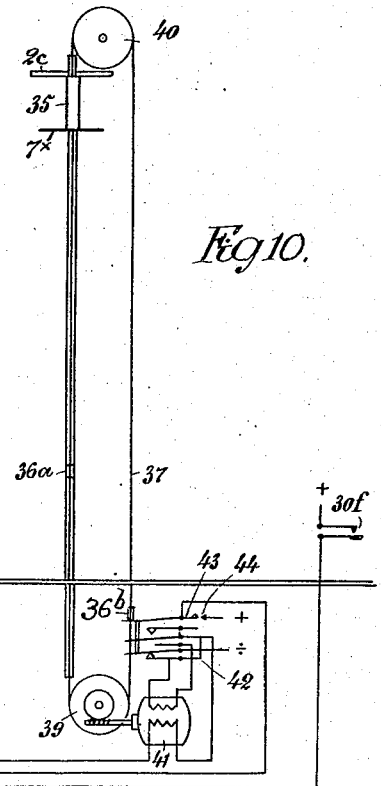
Fig.10.
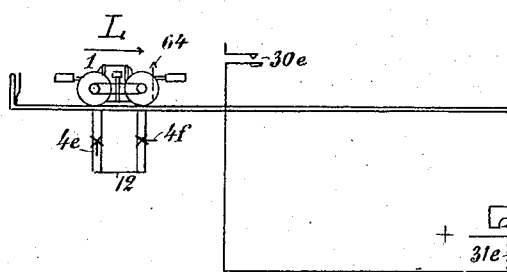
Inventor
Hans Knudsen Haller
by
Spear, Middleton, Donaldson & Spear
Attys

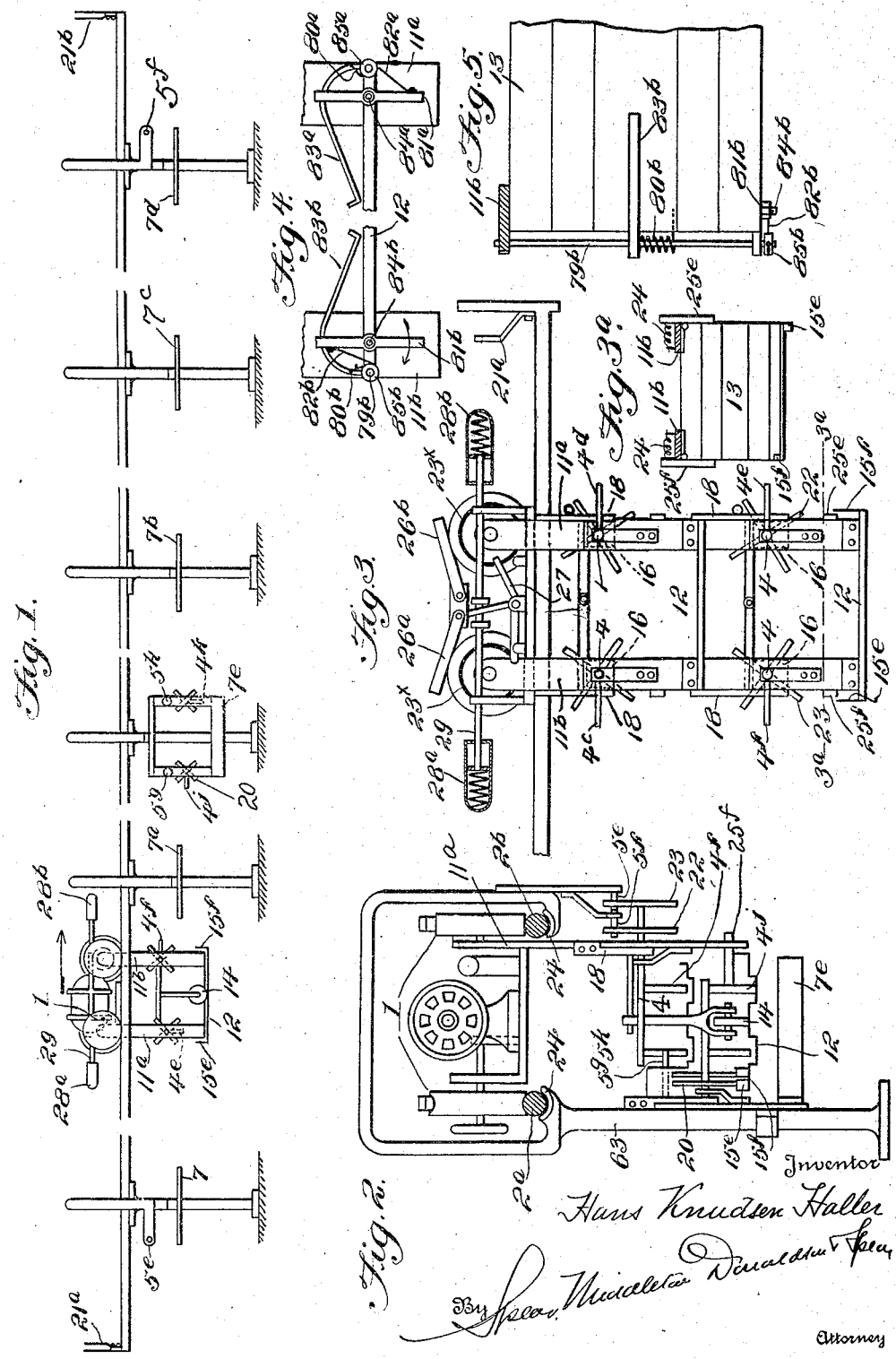

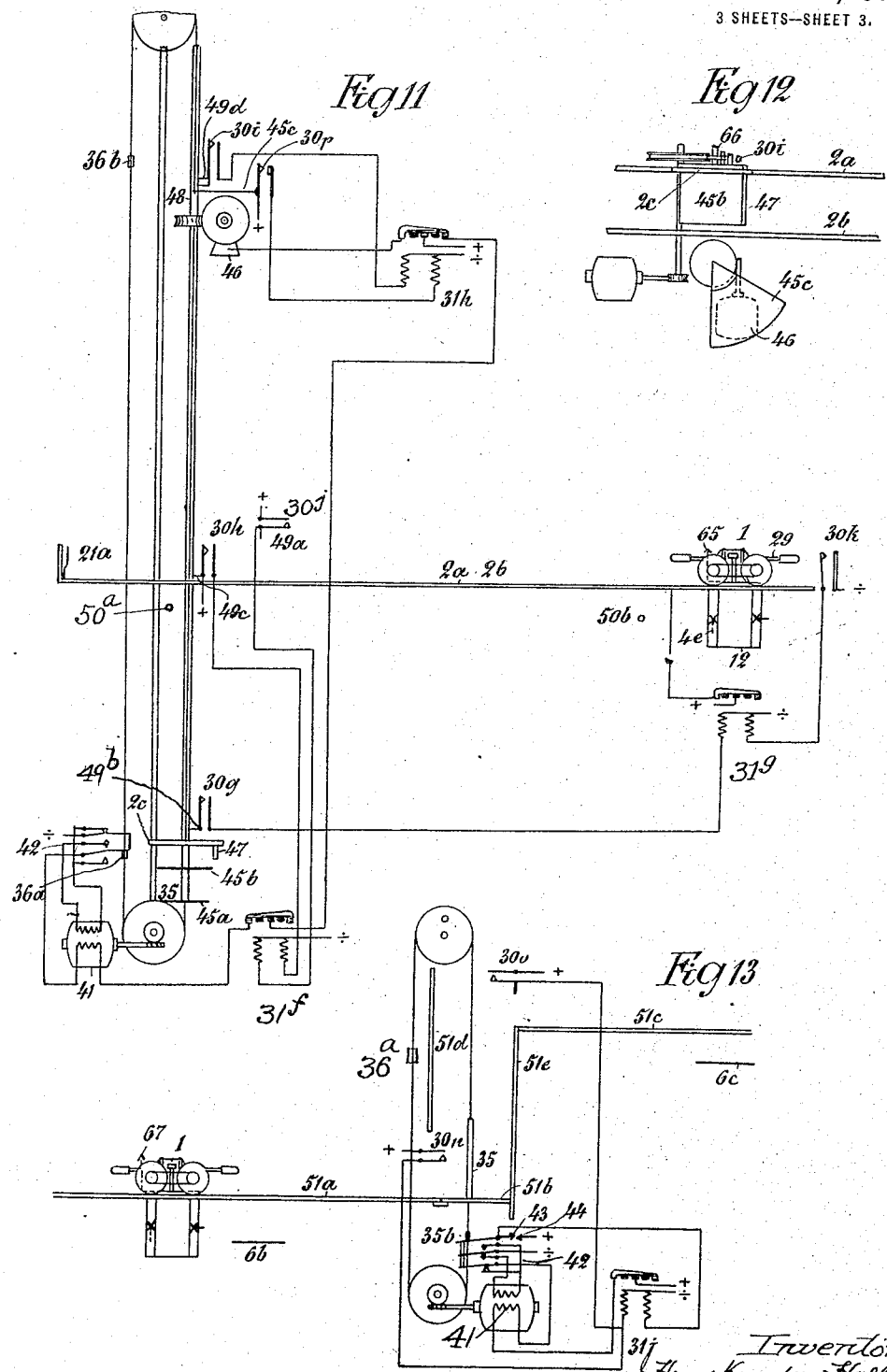

UNITED STATES PATENT OFFICE.

HANS KNUDSEN HALLER, OF COPENHAGEN, DENMARK.

TRANSPORT SYSTEM FOR POSTAGE AND OTHER GOODS.

1,327,952.　　　　　Specification of Letters Patent.　　Patented Jan. 13, 1920.

Application filed June 25, 1918. Serial No. 241,850.

*To all whom it may concern:*

Be it known that I, HANS KNUSDEN HALLER, a subject of the King of Denmark, residing at 79 Dosseringen, Copenhagen, Denmark, have invented certain new and useful Improvements in Transport Systems for Postage and other Goods, of which the following is a specification.

My invention refers to a system for the automatic transport and distribution of telegrams, letters, papers, goods, packages, and the like, and is characterized partly by the use of horizontal transport tracks on which the trucks with built-in motors move, and partly by the use of motor-traction lifts, and if desired by the use of both systems in automatic correspondence; and is also characterized by automatic means for loading, transporting, and unloading the goods, and finally is characterized by means, adapted to the various transport tracks, whereby the goods, during transport, are held fast to the transporting member in such a manner that goods from different places can be loaded on to the same transporting member without releasing the goods already lying on the transporting member, until they reach the place where all the goods are to be delivered.

In the accompanying drawings:

Figure 1 represents the apparatus in side elevation, the view being of diagrammatic character.

Fig. 2 is an end elevation of the truck and associated parts.

Fig. 3 is a side view of the truck.

Fig. 3$^a$ is a sectional plan view of the truck-tray on the line 3$^a$—3$^a$ of Fig. 3.

Fig. 4 is a side view of means for holding the articles on the truck.

Fig. 5 is a plan view of the holding means.

Figs. 6, 7, 8 and 9 illustrate in various operative positions the means for transferring articles from stationary shelves on to the truck.

Fig. 10 is a diagram of a system in which the truck coöperates with an elevator moving up and down.

Fig. 11 is a diagram of a system modified from that of Fig. 10.

Fig. 12 is a diagrammatic plan view of a turn table and associated parts belonging to the system of Fig. 11.

Fig. 13 is a diagrammatic view of a system in which an elevator or lift is employed to transfer the conveyer or truck from one level to another.

On two horizontal, insulated rails 2$^a$ and 2$^b$ there is disposed a three-wheeled or four-wheeled truck 1 with built-in driving-motor. This motor obtains its current from the rails in such a manner that the truck will move forward along them. Beneath, or it might be above, the truck, there may be disposed various supporting ribs 11$^a$ and 11$^b$, which may carry several scrapers or transfer devices 4$^c$ to 4$^f$, as well as tray or floor 12. In Fig. 1 the truck is supposed to run continuously back and forth between the points 21$^a$ and 21$^b$, there being disposed on the truck a switch 29 which is actuated every time the truck reaches one of the end-stations.

In Fig. 1 the truck is supposed to be running in the direction, of the arrow, past the fixed shelves 7$^a$, 7$^b$, 7$^c$ and 7$^d$. During the passage of the truck articles on these shelves are scraped down on to the shelf 12 disposed on the truck, after which they are pressed down by the roller 14. Every time the truck passes a delivery-shelf, the roller 14 runs up over it, and at the same time the scraper 4$^e$ (or 4$^c$) scrapes the article lying on the shelf down on top of the article or articles on the shelf 12 which may have been scraped down from other trays, and then the roller 14 falls down on top of the article. When the truck reaches the shelf 7$^e$, the article or articles lying on the shelf 12 are removed therefrom by the scraper 4$^k$ on to the shelf 7$^e$. The scraper 4$^e$ is tipped up by the pin 5$^g$, the scraper 4$^j$ is tipped down by a pin 15$^e$ on the truck operating on cross 20. The pin 25$^f$ on the truck tips the scraper 4$^k$ up. The truck passes the shelves 7$^c$ and 7$^d$ without taking with it the article lying thereon. Not until the truck has turned at the end station 21$^b$ is the scraper 4$^f$ turned down by the pin 5$^f$, and the articles from the shelves 7$^d$ and 7$^c$ are now scraped down on to the shelf 12 to be removed to the shelf 7$^e$ by the scraper 4$^j$, after which the corresponding re-setting of the scrapers take place. It will be understood that the crosses or arms on the shafts of the scrapers and the pins which are used for operating these arms or crosses, such for instance, as the pins 5$^e$ and 5$^f$ are relatively disposed, in order to secure the actions desired by setting the crosses out of line with each other where necessary, and setting the pins out of line with each other but in line with the particular cross that either pin is to operate so that the proper crosses will hit the proper pins as may be necessary to secure the action described. This out of line arrangement of the pins and cross arms is illustrated in Fig. 2, for instance, see the pins $5^e$ and $5^f$ and the crosses which they are designed to operate.

One form of construction for the scrapers frequently mentioned above is shown in Figs. 2 and 3. On an axle 4 there are disposed a square block 16, cross arms as 22, 23, and the scraper proper. The scraper is held in a horizontal or vertical position by means of a spring 18, which bears against the side of the block 16, the whole being arranged on the ribs $11^a$ or $11^b$ of the truck. The track consists of steel rails $2^a$ and $2^b$, which are carried on rail-supports 63, cushions 24 being interposed which insulate the rails from transmission of electric current and acts as silencers.

Through the live rail $2^a$ and the two wheels of the truck on that side the current is transmitted to one side of the motor, and through the other two wheels which run on truck $2^b$ from the other side of the motor to the said rail $2^b$. The transmission of current from the wheels to the motor takes place through friction-brushes $26^a$ and $26^b$ connected to the motor in the usual way, which also serve to keep the surface of the wheels clean. By means of insulation rings $23^x$ Fig. 3, the naves of the wheels are insulated from the fellies. The insulation 23 also acts as a silencer, to prevent the sound from the motor from being transmitted to the track.

For trucks that run back and forth, there is disposed on the truck a pole-switch 27 (Fig. 3) constructed like a two-blade circuit breaker. This switch is controlled by a rod 29, on the end of which there are resilient caps $28^a$ and $28^b$. When one of these caps at an end-station of the track, strikes against the spring $21^a$ or $21^b$, the pole-switch will immediately be shifted, said spring also insuring an absolutely reliable start when the truck starts to return.

In Fig. 10 a vertical lift-cage 35 with tray $7^x$, is controlled by the horizontal truck 1 with tray 12. Normally the tray $7^x$ stands in another story than that in which the truck moves. When the truck, running to the right, closes the contact $30^e$, the motor 41 is started by the current from the coil $31^e$ due to the tipping of the glass tube $52^e$. The lift-cage 35, with tray $7^x$, will run until the stop-lug $36^a$ on the chain 37 strikes the pole-switch 42 and the current-switch connected with it, whereby a short contact will be closed between the springs 43 and 44. This will cause the armature tube $52^e$ to tilt over by the attraction of coil $31^d$ and cut off the current from the motor 41, which will stand still just at the moment when the tray $7^x$ is at a suitable height for the shelf 12 and scraper $4^e$ on the truck 1. When the truck, after passing the lift 35 and having by a scraper $4^e$ transferred to its shelf 12, the article carried by the lift, reaches the contact $30^f$, the current to the motor 41 is again closed by the coil $31^e$, the lift-cage runs upward until the stop-lug $36^b$ strikes the current-switch 43, thereby causing the pole-switch to shift position. If the truck passes in the opposite direction, the same functions are repeated, only now it is the closing of the contact $30^f$ that carries the lift down and the closing of the contact $30^e$ which again carries the lift up, and the article on $7^x$ is removed by means of the scraper $4^f$, which now stands vertically.

In Fig. 11 there is shown an example of how a vertical lift 35 automatically controls partly a horizontal traveling truck 1 and partly a turn-table 48. The lift runs continuously up and down, the coils $31^f$ and $31^h$ standing in such a manner that the motor 41 gets current. In the lift-cage 35 are trays $45^a$ and $45^b$ and a stationary scraper 47. As the lift-cage runs up, the contact $30^g$ is closed. Thereby current is transmitted to the rail over the relay $31^g$. The truck 1 moves to the left, and the scraper $4^e$ is turned horizontally by the pin $50^b$. When the lift reaches the contact $30^h$, the coil at $31^f$ is energized, and the elevator stops. The truck 1 passes the contact $30^j$, but encounters the arm $49^a$, so that this contact is not closed, and the truck passes across the lift. The pole-switch 29 is caused to shift position by means of the spring $21^a$, and the scraper $4^e$ is turned into its vertical position by the pin $50^a$. Now the truck runs to the right, the scraper $4^e$ removes the articles from $45^a$ on to the shelf 12. Then the truck closes the contact $30^j$ thereby again supplying current to the motor of the lift, which then travels upward. The truck 1 stops, while the pole-switch 29 closes the contact $30^k$, causing the glass tube of coil $31^g$ to tilt.

As the lift 35 passes on, it closes the contact $30^l$. Thereby the glass tube of coil $31^h$ is caused to tilt, the current from the lift-motor 41 is broken, and at the same time the current for the motor 46 is closed, whereby the turn-table 48, with the tray $45^c$ Fig. 12 is rotated over the lift-tray $45^b$, so that the scraper 47 removes the articles lying on $45^c$, on to the tray $45^b$. When the turn-table 48 has accomplished a whole revolution, it closes the contact $30^p$, causing the glass tube of coil $31^h$ to tilt and the circuit for the motor 46 to be broken, and the lift-motor 41 is again supplied with current. The lift runs upward until the stop-lug $36^b$ strikes the pole-switch 42, after which the lift-cage runs downward. On its way down, the lift passes the lugs $49^d$, $49^c$, and $49^b$, which are arranged in such a manner that the respective contacts are not closed.

In Fig. 13 is shown how a truck from the track-section 51ᵃ runs on to a track-section 51ᵇ, which is secured to a lift-cage 35. As the truck passes the contact 30ⁿ, the lift motor 41 is started, and the track-section 51ᵇ, with the truck 1, is raised, until the chain-lug 36ᵃ strikes the pole-switch 42 and the switch 43. The track-section 51ᵇ now stands on a level with the upper rail 51ᶜ, and the truck runs on to it. When the truck, after having been turned at the end of its travel, reaches the contact 30ᵒ, the latter is closed, and the track-section 51ᵇ, with the truck 1, is again lowered to the track 51ᵃ.

Fig. 4 (side view) and Fig. 5 (plan view) show, on a larger scale, a clip arrangement whereby the article is held to the truck-tray 12 during transport. On an axle 79ᵇ, is mounted a pressure-arm 83ᵇ, whose outer end is pressed down on the tray 12, by a spiral spring 80ᵇ. At another point 84ᵇ there is mounted a lever-arm 81ᵇ, which is connected with the arm 83ᵇ by means of a cord or the like 82ᵇ extending around drum 85ᵇ to the upper end of the arm 81ᵇ. When the lower end of the arm 81ᵇ is moved from right to left (see arrow), the cord is pulled, which causes the outer end of the arm 83ᵇ to be lifted from the tray 12. When the pressure on the arm 81ᵇ is released, the spiral spring 80ᵇ again throws the arms 81ᵇ and 83ᵇ into the position shown in the drawing. Pressure on the arm 81ᵇ from left to right under the pivot 84ᵇ will not affect the arm 83.

As shown in Fig. 4 there is an arm 83ᵃ which coöperates with the arm 83ᵇ in holding the article. With this arm are associated the parts 80ᵃ, 81ᵃ, 82ᵃ and 84ᵃ corresponding to the parts 80ᵇ, etc., before described.

Figs. 6, 7, 8 and 9 show more in detail how an article is removed on to a truck-tray, on which there already lies an article, and how the articles are held in place in an effective manner. On the truck-tray 12 (Fig. 6) an article 86 is shown as held fast by the pressure arms 83ᵃ and 83ᵇ and pressed down by a roller 14. An article 85, which is to be transported to the same place as the article 86, is placed on the stationary tray 7ᶜ. When the truck reaches this tray 7ᶜ (Fig. 7) the roller 14 runs up on to the article 85. A little later the lever arm 81ᵃ engages the stationary track 78, so that its cord 82ᵃ will be drawn upon and the pressure arm 83ᵃ is turned to a vertical position, it being noted that this cord extends to the lower end of the arm 81ᵃ instead of to the upper end as in the case of the companion arms. At the same time the arm 4ᶠ pushes forward the article 85. The article 86 is meanwhile held fast by the pressure arm 83ᵇ. When the truck moves farther on (Fig. 8), the roller 14 presses the article 85 down on top of the article 86. The arm 81ᵃ being released by leaving the track 78, the pressure-arm 83ᵃ springs down on to the articles 85 and 86. At the same time the lever arm 81ᵇ strikes the stationary track 78, and the arm 83ᵇ flies up and then closes over both articles 85 and 86, which are thus now held fast by both pressure-arms 83ᵃ and 83ᵇ. At the station where the articles are to be delivered, (Fig. 9) there is a scraper 4ʲ and a receiving tray 7ᵉ. The lever arms 81ᵃ and 81ᵇ being engaged by the tray, are turned so far that the pressure-arms 83ᵃ and 83ᵇ turn through an angle of 180 degrees, thereby releasing the articles. The scraper 4ʲ, during the passage of the truck, removes the articles from the truck-tray 12 on to the stationary tray 7ᵉ and the pressure-roller 14 prevents the article from being lifted up. The scraper 4ᶠ is tilted into a horizontal position by the stationary pin 5ᵍ. When the truck has passed the station, the pressure arms 83ᵃ and 83ᵇ again fly over on to the now empty tray 12.

In all cases the truck is given a back and forth movement. In one of the forms this movement is interrupted and the truck is raised and lowered at an intermediate point of its back and forth travel, but this is a specific modification of the broad principle involved in all of the systems described.

I have shown on the conveyer scrapers 4ᶜ and 4ᵈ above the level of scrapers 4ᵉ and 4ᶠ so that these upper scrapers and the parts associated therewith can be used with a second set of trays or shelves to increase the capacity of the apparatus.

What I claim and desire to secure by Letters Patent is:—

1. In combination a conveyer, means for automatically giving it a back and forth movement, stationary shelves to contain articles, automatically self adjusting scrapers on the conveyer which sweep articles from the stationary shelves onto the conveyer and scrapers arranged at fixed points and automatically adjusted by the moving conveyer to sweep the articles from the conveyer, substantially as described.

2. In connection with the features of claim 1 adjusting the scraper means on the moving conveyer by means of stationary members against which parts of the scraper means strike, substantially as described.

3. In connection with the features of claim 1 a pair of scrapers on the conveyer one behind the other and means for rendering each active and the other inactive alternately according as the conveyer moves in one direction or the other.

4. In combination a back and forth moving conveyer, a pair of scrapers thereon, article supporting means, means for adjusting the scrapers automatically whereby one is active in one direction and the other in the opposite direction while the other is inactive, said scrapers acting alternately according to the direction of travel to collect articles upon the conveyer from the article support, and a pair of discharge scrapers one in advance of the other at fixed points and means on the conveyer for adjusting them whereby one of said scrapers discharges the articles from the conveyer when going in one direction and the other effects said discharge when the conveyer is moving in the opposite direction, said scrapers being alternately active and inactive, substantially as described.

5. In connection with claim 1 the scrapers being pivotally mounted and means for turning them from a vertical active position to a substantially horizontal inactive position, substantially as described.

6. In connection with the features of claim 1 means for operating the scrapers comprising cross arms mounted on the shafts of the scrapers and fixed pins for contacting with said arms for turning the scraper shafts, substantially as described.

7. In connection with the features of claim 1 means for holding the articles on the traveling conveyer comprising a pivotally suspended pressure roller, substantially as described.

8. In combination with the apparatus set forth in claim 1, means for holding the articles on and releasing them from the traveling conveyer comprising arms pivotally mounted, springs for exerting pressure upon said arms, a rope and pulley connection to the arms, and levers for operating the rope and means against which the lever strikes to be operated thereby, substantially as described.

9. In connection with the apparatus set forth in claim 1, a motor for driving the conveyer and a switch for regulating the direction of current through the motor, said switch being carried by the conveyer and means for automatically operating the switch at the end of the travel of the conveyer in either direction, substantially as described.

10. In combination a conveyer, means for giving a back and forth movement to the said conveyer, a lift cage, an electric motor for moving said lift cage, and means controlling the action of the motor through the back and forth moving conveyer, substantially as described.

11. In combination a conveyer having an electric motor mounted thereon for driving the same, rails upon which the conveyer runs and through which the motor derives its current, automatically operating reversing means on the conveyer, means at the ends of the travel of the conveyer for operating the reversing means so that the conveyer will travel back and forth, a lift cage, a motor for operating the same, means controlled by the conveyer for controlling the lift operating motor and means carried by the lift cage mechanism also controlling the motor, substantially as described.

12. In combination a horizontally moving conveyer, a vertically moving lift conveyer, a motor for each of said conveyers and switches and relays operated by one of said conveyers, said switches and relays controlling the motor of the other conveyer, substantially as described.

13. In combination a back and forth moving conveyer, means for driving the same and automatically reversing its movement, a lift cage, means for operating the same controlled by the back and forth moving conveyer and an automatically operating turn table for delivering articles onto the lift cage, substantially as described.

In testimony whereof I have affixed my signature in presence of two witnesses.

HANS KNUDSEN HALLER.

Witnesses:
C. F. OTTOSEN,
A. GOTTLIEB.